(12) United States Patent
Heydari

(10) Patent No.: US 10,735,176 B1
(45) Date of Patent: Aug. 4, 2020

(54) HIGH-SPEED DATA RECOVERY WITH MINIMAL CLOCK GENERATION AND RECOVERY

(71) Applicant: Payam Heydari, Irvine, CA (US)

(72) Inventor: Payam Heydari, Irvine, CA (US)

( * ) Notice: Subject to any disclaimer, the term of this patent is extended or adjusted under 35 U.S.C. 154(b) by 0 days.

(21) Appl. No.: 15/891,320

(22) Filed: Feb. 7, 2018

Related U.S. Application Data

(60) Provisional application No. 62/456,521, filed on Feb. 8, 2017.

(51) Int. Cl.
*H04L 7/00* (2006.01)

(52) U.S. Cl.
CPC .......... *H04L 7/0008* (2013.01); *H04L 7/0091* (2013.01)

(58) Field of Classification Search
CPC .................. H04L 7/0008; H04L 7/0091
See application file for complete search history.

(56) References Cited

U.S. PATENT DOCUMENTS

| | | | | |
|---|---|---|---|---|
| 7,027,529 B1* | 4/2006 | Ohishi | ............... | H03D 3/009 375/329 |
| 8,024,142 B1* | 9/2011 | Gagnon | ............. | G01R 19/2509 702/69 |
| 8,861,573 B2* | 10/2014 | Chu | ............. | H04L 7/0091 375/219 |
| 9,379,878 B1* | 6/2016 | Lugthart | ............... | H04L 7/033 |
| 9,832,006 B1* | 11/2017 | Bandi | ............. | G11C 7/222 |
| 10,171,115 B1* | 1/2019 | Shirinfar | ............... | H04B 17/12 |
| 2004/0130347 A1* | 7/2004 | Moll | ............. | G06F 13/423 326/62 |
| 2008/0143422 A1* | 6/2008 | Lalithambika | ..... | G01R 31/3167 327/525 |
| 2009/0174448 A1* | 7/2009 | Zabinski | ............... | H03L 7/00 327/161 |
| 2011/0029803 A1* | 2/2011 | Redman-White | ......... | G06F 1/12 713/502 |
| 2011/0167297 A1* | 7/2011 | Su | ............. | H04L 7/0054 714/15 |
| 2011/0293041 A1* | 12/2011 | Luo | ............. | H04L 5/20 375/316 |
| 2012/0192023 A1* | 7/2012 | Lee | ............. | H03K 3/356173 714/746 |
| 2015/0172040 A1* | 6/2015 | Pelekhaty | ............... | H04J 14/02 398/79 |
| 2017/0317859 A1* | 11/2017 | Hormati | ............... | H04L 7/0087 |
| 2017/0331651 A1* | 11/2017 | Suzuki | ............... | H04L 7/0016 |

* cited by examiner

*Primary Examiner* — Jean B Corrielus
(74) *Attorney, Agent, or Firm* — Richard E. Ballard

(57) ABSTRACT

A data transmission link includes a transmitter superpositioning a data signal and a clock signal to generate a first signal. The transmitter transmits the first signal, through a link, wherein, the clock signal has a frequency equal to or higher than a Nyquist frequency of the data signal.

17 Claims, 6 Drawing Sheets

A High-Speed Data Recovery Technique with Minimal Clock Generation/Recovery Complexity FIG. 2A
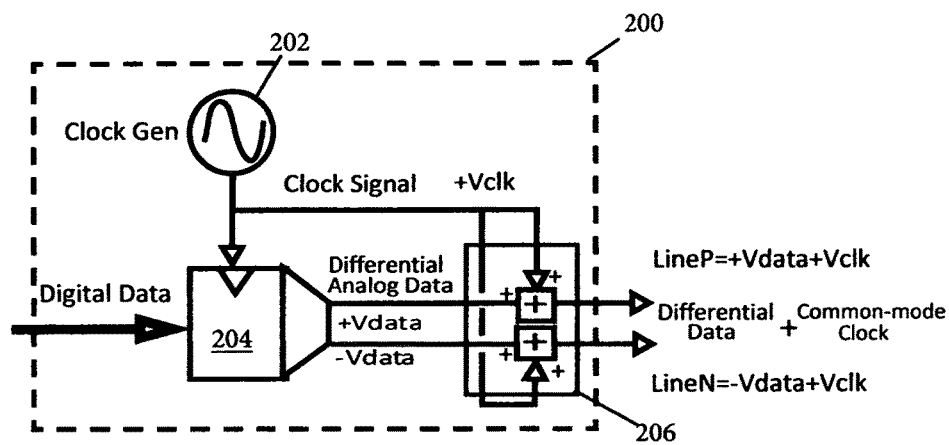
FIG. 2B
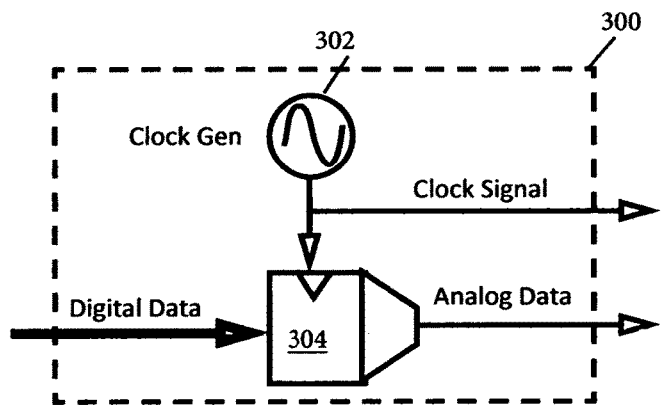
Figure 2

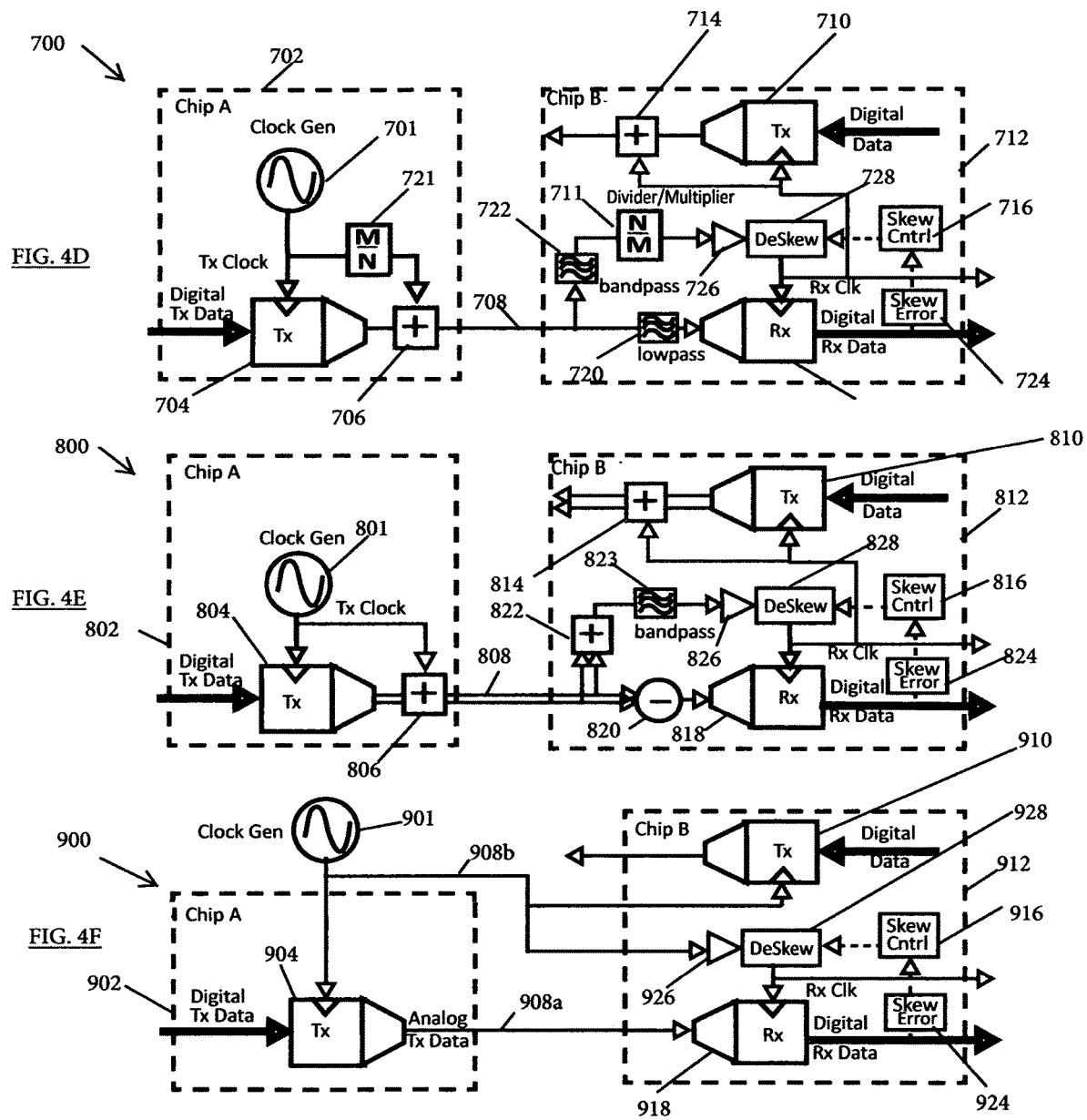

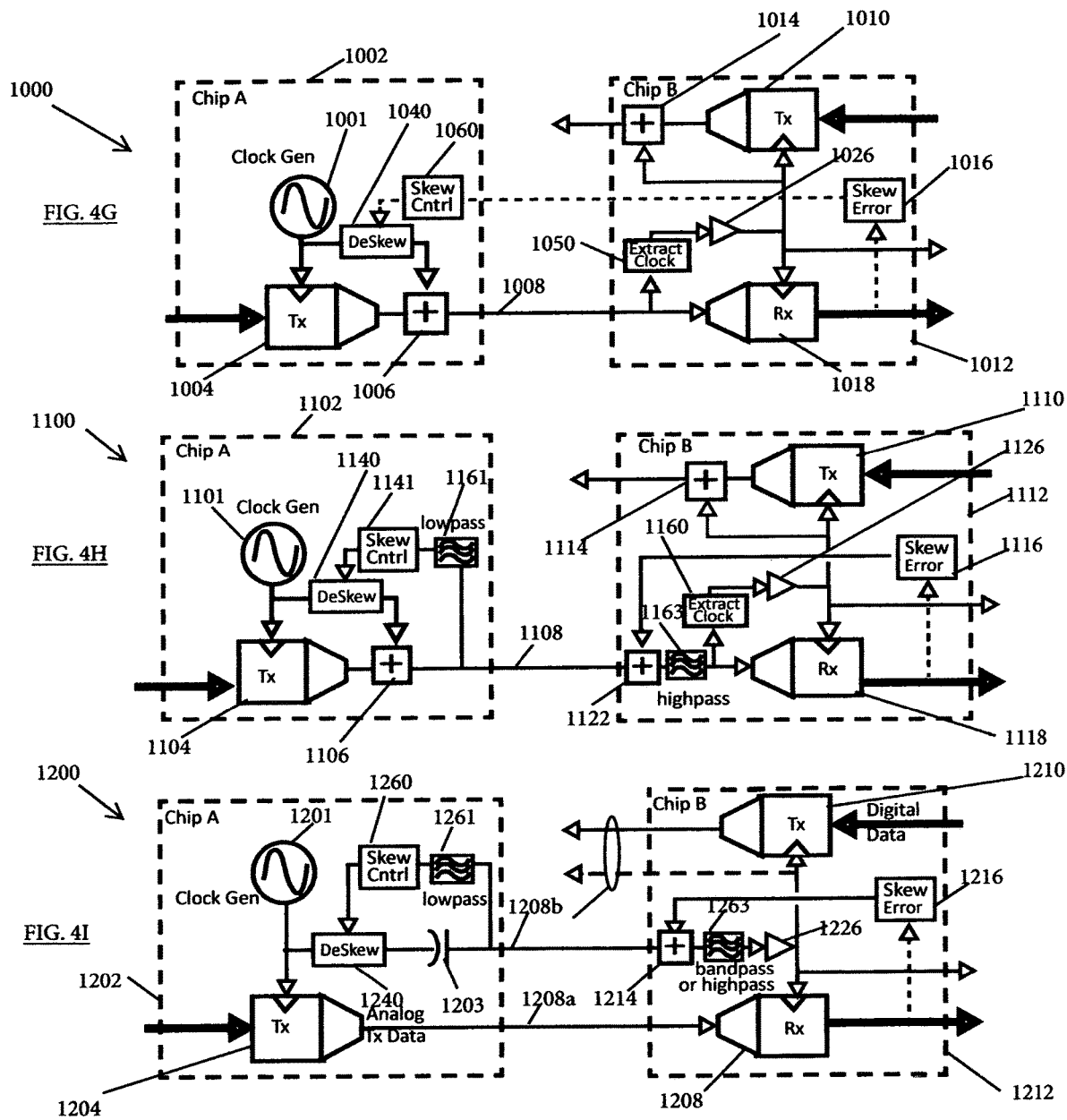

US 10,735,176 B1

HIGH-SPEED DATA RECOVERY WITH MINIMAL CLOCK GENERATION AND RECOVERY

CROSS REFERENCE TO RELATED APPLICATIONS

The application claims priority to U.S. Provisional Application No. 62/456,521, filed on Feb. 8, 2017, filed by Payam Heydari, and entitled "A High-Speed Data Recovery Technique with Minimal Clock Generation/Recovery Complexity".

TECHNICAL FIELD

The invention relates to high-speed data transmission links, and more particularly to clock generation and recovery in high-speed data transmission links.

BACKGROUND ART

High-speed transmissions links, including transceivers, are used for a wide variety of applications. For example, among others, consumer electronics, such as smart phones, base stations, and between servers and switches in high-performance computing and networking are common applications.

This wide use is due in part to the advancement of technology allowing for high-speed transmission of information, for example in the Gigabits/second range. As technology continues to improve, there is an increasing demand on communications links/channel to keep up and reliably transmit data. In general, high-speed transmission links currently suffer from noise-induced disruptions and even loss of data in some cases.

SUMMARY OF VARIOUS EMBODIMENTS

In an embodiment of the invention, a data transmission link includes a receiver responsive to a first transmitted signal through a transmission link. The first transmitted signal includes a clock signal superpositioned onto a data signal. Particularly in applications requiring high-speed communications, the skew error between the data signal and the clock signal that is used to sample the data signal, at the destination receiver, is eliminated or minimized. At the link destination, a first filter receives the first transmitted signal and substantially removes the clock signal from the first transmitted signal, thereby extracting a first data signal therefrom. A second filter receives the first transmitted signal and substantially removes the data signal from the first transmitted signal, thereby extracting a first clock signal therefrom. An adjustable de-skew circuit is coupled to the second filter, receives the first clock signal and substantially removes the first clock signal skew error relative to the data signal, to generate a second clock signal, wherein the first data signal is sampled using the second clock signal to increase the timing margin at sampling point thus the reliability of data detection.

In some embodiments, the data transmission link includes a skew-error detection circuit that detects the skew error between the first clock signal of the transmitted first signal and the center of at least some of the each of the data symbols of the series of data symbols. The skew-error detection circuit is coupled with a skew-control circuit that receives the skew error and performs averaging of the skew error over a predetermined number of data symbols and applies the averaged skew errors to the adjustable de-skew circuit.

In some embodiments, the transmitted first signal is a form of a first signal after the first signal travels through the transmission link, the first signal includes a differential data signal and a common-mode dock signal, where the first signal is transmitted by a transmitter that includes a differential transmission channel that superpositions the differential data signal and the common-mode dock signal before the first signal is transmitted to the receiver.

BRIEF DESCRIPTION OF THE DRAWINGS

The foregoing features of embodiments will be more readily understood by reference to the following detailed description, taken with reference to the accompanying drawings, in which:

FIGS. 1, 2A, and 2B schematically illustrate transmitters of various embodiments of the invention;

FIGS. 4A-4I schematically illustrate data transmission links, in accordance with some embodiments of the invention.

DETAILED DESCRIPTION OF SPECIFIC EMBODIMENTS

In various embodiments, a receiver of a data transmission link receives a transmitted first signal through a transmission link, the transmitted first signal including a transmitted superposition of a data signal and a clock signal, where the data signal is made of a series of data symbols. The data transmission link further includes a first filter and a second filter where the first filter receives the transmitted first signal and substantially removes the clock signal from the transmitted superposition of a data signal and a clock signal, extracting the data signal therefrom. The second filter also receives the transmitted first signal and substantially removes the data signal of the transmitted superposition of a data signal and a clock signal, extracting a first clock signal therefrom. The first clock signal includes a skew error relative to the data signal at the destination (transceiver/receiver), introduced to the transmitted first signal during transmission of a first signal through the transmission link, separate filtering process and buffering of data signal and clock signal. The data transmission link further includes an adjustable de-skew circuit coupled to the second filter and receiving the first clock signal to substantially remove the skew error relative to the data signal from the first clock signal and generate a second clock signal. The receiver samples the extracted data signal using the second clock signal by sampling at least some of each of the data symbols of the series of data symbols of the extracted data signal substantially at a center of each data symbol.

Figure 1:
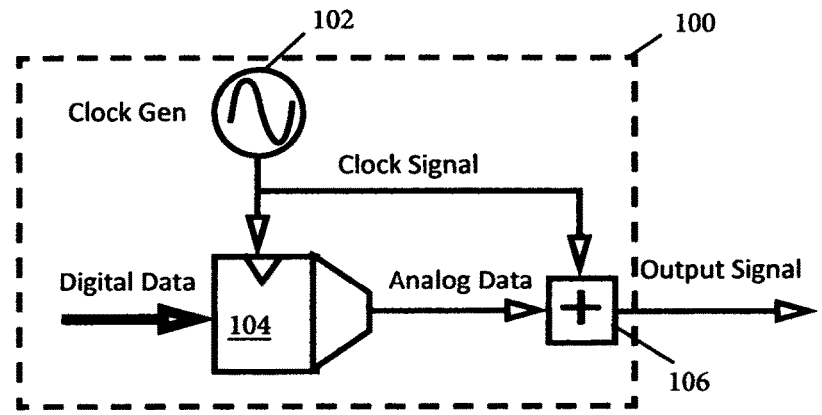

FIGS. 1, 2A, and 2B schematically illustrate transmitters of various embodiments of the invention. With reference to FIG. 1, a transmitter 100, which is typically a part of a data transmission link, is shown to include a clock signal generator 102, a data converter 104, and a combiner 106 (also referred to herein as the "summer"), in accordance with some of the embodiments of the invention. The data converter 104 is shown to receive digital data, i.e. data/information in digital form, and convert the received digital data to analog data, at a sampling rate dictated by a clock signal that is generated by the clock signal generator 102. The analog data and the clock signal from the generator 102 are combined with each other, by the combiner 106, to generate an output signal. That is, data and clock are superpositioned or superimposed onto each other. The output signal, generated by the combiner 106, is therefore made of superpositioned (or superimposed) clock signal and analog data in analog form. The combiner 106 is merely an exemplary embodiment of superpositioning and other methods, suitable for the data and clock, may be substituted. The output signal is typically transmitted from the transmitter 100 to a transceiver or (destination) receiver over a transmission link, as will be further discussed below. The converter 104 needs to sample data at a rate that is at least equal to the Nyquist rate/frequency of data symbol rate.

The transmitter 100, along with any of the transmitter of the various embodiments of the invention, may be employed in any application that requires the transmission of information over a link at high speeds. In some embodiments, the transmitter 100 is formed in a semiconductor, IC (Integrated Circuit) or "chip" that communicates with another chip of a device that is physically located externally to a device that houses it or located in the same device as that which houses it. For instance, the transmitter 100 may be formed in a smart phone that is in communication with the transceiver (or receiver) of a base station or it may be located in the same smart phone as that which houses a receiver.

FIG. 2A schematically illustrates a differential transmitter of various embodiments of the invention. The embodiment of FIG. 2A is analogous to that of FIG. 1 except that the transmitter 200, in FIG. 2A, has a combiner 206 instead of the combiner 106 and the data converter 204 has a differential output, i.e. differential analog data, in place of the analog data, the output of the data converter 104. The clock signal of the transmitter 200, generated from the clock signal generator 202, is input to both inputs of the combiner 206. The clock signal is added equally and with same polarity to each of the data outputs of the differential analog data, as shown in FIG. 2A. Therefore, two summation operations are performed by the combiner 206, one for each output of the differential analog data. In this respect, the output of the combiner 206 is two signals, each carrying data and clock information wherein output is composed collectively of a differential data signal plus a common-mode clock signal. This is referred to herein as the "common-mode clock".

FIG. 2B schematically illustrates a yet another transmitter embodiment in accordance with some embodiments of the invention. In FIG. 2B, the transmitter 300 is shown to include a clock signal generator 302 and a data converter 304, much in the same manner as that which is shown relative to the transmitter 100 except that the output of the converter 304 and the clock signal generated by the clock signal generator 302 are transmitted independently over separate channels. The clock generator can be formed on the same or a different chip (or device) relative to the transmitter and transmitted to the transmitter 304 as well as to the destination receiver located on a receiving part of the link.

Figure 3:
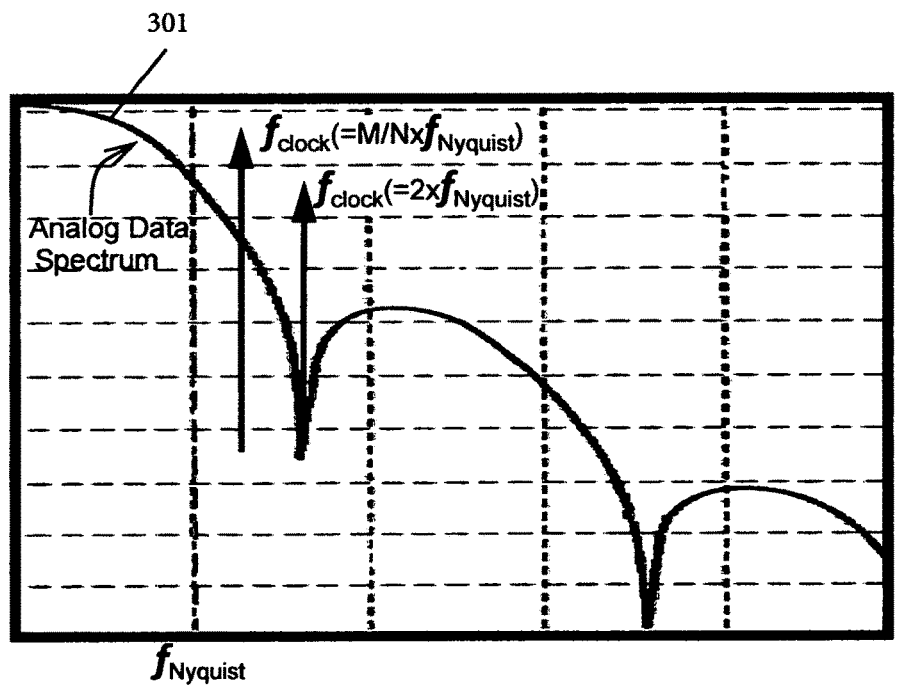
FIG. 3 illustrates a graph of power spectrum density at the output of a transmitter of some embodiments of the invention.

FIG. 3 shows a graph of the power spectrum density (PSD) of various transmitters of the invention. In FIG. 3, the curve 301 represents the (analog) data spectrum, for example, representing the output of each of the transmitters 100, 200, and 300 of the invention although it is understood that other transmitters may be employed and that the transmitters 100, 200, and 300 or any others shown and/or discussed herein are merely examples provided for the purposes of discussion. FIG. 3 also shows the Nyquist frequency, at $f_{Nyquist}$, the minimum rate at which the data at the output of the transmitter must be sampled without introducing errors into the data. The Nyquist frequency is half the data signal symbol rate, or half the minimum required clock sampling frequency for proper reconstruction of the data post sampling. The graph of FIG. 3 also shows a couple of examples of the frequency (or rate) of the clock signal generated by the clock signal generator, such as, without limitation, the clock signals used to generate the output data signals in the transmitters 100, 200, and 300. In one example, the clock rate is $2 \times f_{Nyquist}$, that falls in the notch frequency of the data signal power spectrum. In this scenario, the clock signal is filtered out from the data signal by any low-pass filter with a above $f_{Nyquist}$ and below $2 \times f_{Nyquist}$. Such large range for the low-pass filter bandwidth relaxes the filter design implementation; however, transmitting & recovering the clock signal at such high frequency in a very low-pass channels leads to very small clock signal at the receiver, and thus can add to the receiver clock recovery challenges. In another example, clock signal frequency is M/N times the Nyquist frequency, with "M" and "N" each representing an integer value. In accordance with an exemplary and practical implementation, the M/N ratio may be between one and two. Maintaining the ratio of M/N above unity generally keeps the clock signal frequency outside of the data signal Nyquist (frequency) band allowing for ease-of-recovery of the data by a low-pass filter with a bandwidth of $f_{Nyquist}$. In contrast, maintaining the ratio of M/N below the value two (2) reduces the attenuation typically experienced by the clock signal when traveling through a low-pass transmission channel.

On the receiver side, a clock frequency at $2 \times f_{Nyquist}$ is generally required for the purpose of sampling the data signal in an effort to recover the data signal by sampling data symbols, which form, at least in part, the data signal. In the event the clock signal has a frequency of $2 \times f_{Nyquist}$ or thereabout, when transmitted, the receiver only needs to extract the clock signal, a bandpass filter with a bandwidth of $2 \times f_{Nyquist}$ or thereabout, can be employed to de-skew (or adjust) the timing of the clock signal for reliable data sampling.

In the case where the clock signal has a frequency that is M/N times the $f_{Nyquist}$, or thereabout, when transmitted, the receiver needs to extract the clock signal with a bandpass filter having a bandwidth frequency of about $M/N \times f_{Nyquist}$. The filtered clock signal is multiplied by $2 \times N/M$ to arrive at a frequency of $2 \times f_{Nyquist}$. Alternatively, the clock signal is multiplied by a ratio N/M to generate a clock signal with the frequency $f_{Nyquist}$, or thereabout, and that is a differential signal, to cause sampling at the both edges of the clock signal, i.e. rising and falling edges, therefore resulting in an effective sampling rate of approximately $2 \times f_{Nyquist}$.

Figure 4A:
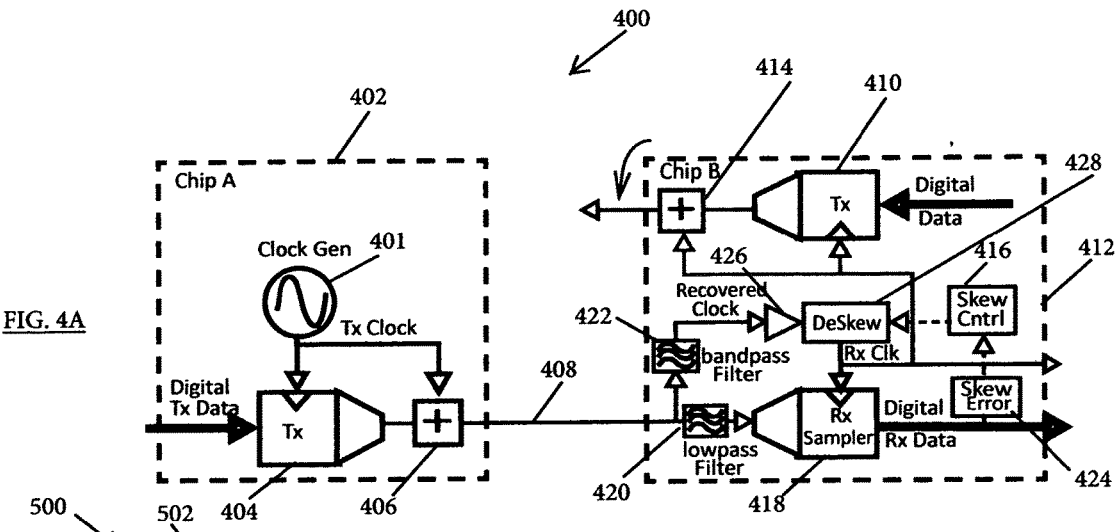

FIGS. 4A-4H schematically illustrate data transmission links, in accordance with some embodiments of the invention. In FIG. 4A, a data communication link 400 is shown to include a transmitter 402 and a transceiver 412, in communication with each other through a link 408, which may be a wired or a wireless link. Typically, in applications where data is communicated at a fast rate, the embodiments of the invention offer an advantage over those currently known in the art.

The transmitter 402 is similar to the transmitter 100 and therefore includes a clock signal generator 401, a data converter 404 and a combiner 406. The converter 404 may also be viewed as a data transmitter, as with all transmitters shown and discussed herein. Data to be transmitted, typically in digital form, is received by the converter 404 and processed at a rate dictated by the clock signal which is generated by the clock signal generator 401. The data is ultimately output in analog form, by the converter 404, and combined (or summed) with the clock, generated by the clock signal generator 401, also referred to herein as the "transmitter clock", and the combination thereof is output onto the link 408 and received by the transceiver 412. At the transceiver 412 however, the data arrives with some noise interjected by the link 408, and is therefore in altered form. It is obviously desirable to reconstruct the data at the output of the transmitter 402. This is done by the transceiver 412.

The transceiver 412 is shown to include a transmitter 410 (also referred to herein as "transmitter sampler), a receiver sampler 418, a summer 414, a low pass filter 420, a bandpass filter 422, a skew error detector 424, a skew controller 416, an adjustable de-skewer circuit 428 (sometimes referred to herein as the "de-skewer"), and a clock amplifier (or clock buffer) 426 although the amplifier 426 is optional. The low pass filter 420 and the bandpass filter 422 each receive the data from the link 408 and one is used to extract the data transmitted by the transmitter 402 and the other is used to extract the clock signal transmitted by the transmitter 402.

The combination of the skew error detector 424, the skew controller 416 and the de-skewer 428 is referred to herein as the "skew-error detection circuit". The skew-error detection circuit detects the skew error between the extracted clock signal and the center of a data symbol. The skew controller 416 of the skew-error detection circuit receives the skew error (from the skew error detector 424) and performs averaging of the skew error over a predetermined number of data symbols and applies the averaged skew errors. The clock signal is adjusted using the skew error such that, for example, in the case where the skew error is 10 pico seconds, the edges of the clock signal are delayed by 10 pico seconds or adjusted ahead by 10 pico seconds. The adjustable de-skew circuit 428 makes this correction therefore substantially removing the clock signal-to-data signal skew error.

The receiver sampler 418 is shown coupled to the low pass filter 420 and samples the output of the low pass filter 420, at a rate of the receiver clock signal, which is received from the de-skewer 428. The de-skewer 428 is shown to receive input from the amplifier 426 and from the skew controller 416 and uses the same to generate the receiver clock employed by the receiver sampler 418. The sampled values, generated by the sampler 418, is shown as the "digital receiver data" and provided as input to the skew error detector 424. The skew controller 416 acts as the interface between the de-skewer 428 and the skew error detector 424 in that it determines how much and when to provide the skew error correction, generated by the skew error detector 424, and when not to do so. The averaged skew error from the skew error detector 424 is ultimately used by the de-skewer 428 to remove the timing skew between the sampling clock and the data received at the input of the transceiver 412. The de-skewer 428 is an adjustable de-skewer circuit that essentially adjusts the clock signal used by the sampler 418 to sample the in-coming data signal (the product of the low pass filtered data), at a location within each of the data samples that is substantially in the middle of the data symbol to increase the reliability of the data being received from the transmitter. A data symbol is made of a set of data samples and represents a value or information, in digital form, that is transmitted from the transmitter 402 to the transceiver 412.

The de-skewer 428 is able to remove the skew from the data by providing an output that is used by the sampler 418 to sample the output from the low pass filter 420. In this manner, the time of sampling of the data signal is adjusted to account for the skew error introduced during signal transmission. The use of the low pass filter 420 causes the data signal, rather than the clock signal to remain in the signal received at the time of sampling by sampler 418. As shown in the graph of FIG. 3, a suitable low pass filter should eliminate signals with frequencies higher than the Nyquist rate or thereabouts. Because the clock rate, an example of which is also shown in FIG. 3, is higher than the Nyquist rate, the clock signal, sent in combination with data, should be removed.

Conversely, a bandpass filter, such as the filter 422, which eliminates signals having a lower frequency, such as signals with frequencies at the Nyquist frequency or lower, is employed to eliminate the relevant part of the data signal while leaving the clock signal. After substantial elimination of the data signals, the filtered clock signal (or output of the filter 422), also referred to herein as the "recovered clock", is received by the amplifier 426 and the output of the amplifier 426 is received as input by the de-skewer 428. The amplifier 426 may be a buffer in some embodiments of the invention.

The receiver clock, i.e. output of the de-skewer 428, is also shown to be provided to the summer 414 of the transceiver 412. This is done for use in transmitting data by the transceiver 412. More specifically, digital data can be transmitted by the transceiver 412, in analog form, by converting the digital data using the converter 410, with the digital data being sampled at the rate of the receiver clock, and then summed, by the summer 414 with the receiver clock before being transmitted. Accordingly, the output of the summer 414, which is essentially the output of the transceiver 412, is a signal made of both data and clock. In scenarios where the transceiver 412 transmits data signals back to the transceiver 402 or any other transceiver/receiver that uses a clock signal from a source common to the transceiver 402, there is no need to add the clock and data signals at the transceiver 412 because the clock signal is already available at the destination receiver and clock recovery from the received data signal is therefore unnecessary.

Figure 4B:
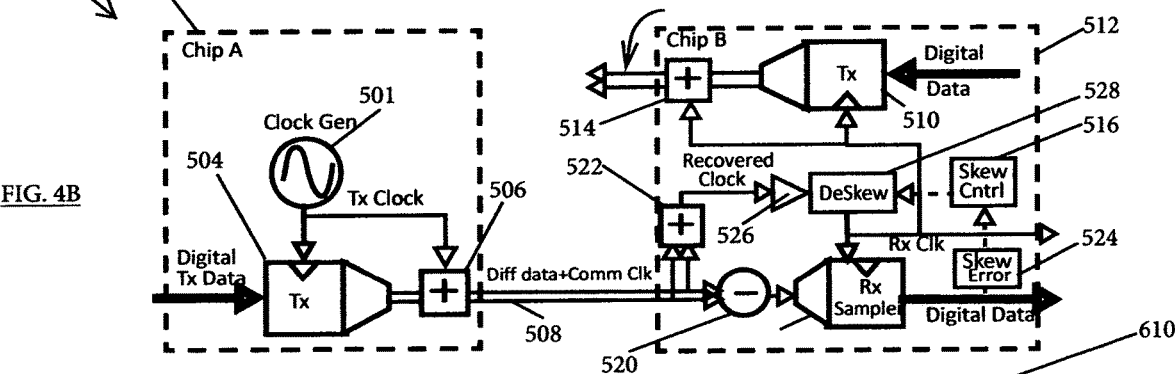

FIG. 4B shows a data transmission link 500, in accordance with another embodiment of the invention. The data transmission link 500 is a combination of the transmitter 200 of FIG. 2A, referenced as the transmitter 502 in FIG. 4B, with the transceiver 512. Thus, the output of the transmitter 502 is a differential output that carries a combination of data and a common-mode clock and is transmitted by the transmitter 502, through the link 508, to the transceiver 512.

The transceiver 512 is shown to include a receiver sampler 518, a transmitter 510 (or "converter"), an amplifier 526, a summer 522 and another summer 514, a de-skewer 528, a subtractor 520, which can be a summer, a skew error detector 524, and a skew controller 516. As discussed with reference to FIG. 4A, the transceiver 512 may also transmit data, in addition to receiving data. The transmitter is made of the summer 514 and the converter (or "data transmitter") 510, the latter using a recovered clock signal generated by the transceiver 512, to sample the data that is to be transmitted (or convert the data from a digital form to an analog form using the recovered clock), and the former combining in analog domain the recovered clock signal with the data signal from the transmitter 510, into a combined signal that is output by the summer 514. The common-mode clock signal is added to both transmitter 510 differential output signals by the summer 514, to generate a new pair of output signals for transmission.

The receiver portion of the transceiver 512 is made of all other components shown within the transceiver 512 (except the summer 514 and the sampler 510). A differential link 508 carries a differential signal that is a combination of differential data signal and common-mode clock signal. When received through the link 508, by the transceiver 512, the combined data and clock signals, i.e. the received differential signal, includes a skew error introduced during transmission through the link 508, which must be removed, at least substantially. This is done by the receiver portion of the transceiver 512 by adding the two parts of the received differential signals together, using the summer 522, to generate a single signal where the differential data signal is substantially removed while the common-mode clock signal remains. The single signal is amplified by the amplifier 526, and ultimately provided, after amplification, to the de-skewer 528 for removal of the skew error.

Additionally, the received differential signals are subtracted from one another by the subtractor 520 and provided as a single input to the sampler 518 for sampling and conversion from analog form to digital form. It is understood that the receiver samplers of the transceivers shown and discussed herein, such as the samplers 418, 618, 718, . . . , are samplers and converters from analog form to digital form, a function that is reverse relative to the sampling by associated transmitters 404, 604, . . . . The addition of the two differential signals by the summer 522 has the effect of cancelling out the data and leaving in the clock signal that is received by the transceiver 512. Whereas, subtraction of the two signals by the subtractor 520 has the effect of removing the clock signal and leaving in the data signal that is received by the transceiver 512.

Traditional techniques employ phase lock loops to lock in the clock signal, which is cumbersome and prove unreliable for applications requiring fast transmission speeds. This is particularly true for wideband applications. Whereas, various embodiments of the invention use common-mode approaches or combine data and clock signals allowing reliable communication in wideband applications. The following equations lend visibility into the outcome achieved by combining clock and data signals.

Referring back to FIG. 4B, the recovered clock, provide by the summer 522, is amplified by the amplifier 526, as previously noted, and after amplification, provided to the de-skewer 528 as input. The de-skewer 528, much like its counterpart de-skewer 428, generates a clock signal adjusted to account for the skew error introduced during transmission through the link 508 and sampling the received data, at the output of the substractor 520, substantially in the middle of each of the data samples. Sampling data at substantially the center thereof helps ensure against errors resulting from sampling at outer edges thereof. That is, the closer to the middle of the data being sampled, the greater the reliability of the received data.

Assuming:

$$LineP = Vdata + Vclk \qquad \text{Eq. (1)}$$

$$LineN = -Vdata + Vclk \qquad \text{Eq. (2)}$$

The following is noted:

$$Vdiff = LineP - LineN = (Vdata + Vclk) - (-Vdata + Vclk) = 2Vdata \qquad \text{Eq. (3)}$$

$$Vcom = LineP + LineN = (Vdata + Vclk) + (-Vdata + Vclk) = 2Vclk \qquad \text{Eq. (4)}$$

where, $Vdata$: Single-ended data signal; and  Eq. (5)

$Vclk$: Single-ended clock signal.  Eq. (6)

"LineP" and "LineN" are each shown in FIG. 2A as outputs of the transmitter 200. Accordingly, as noted in Eqs. (3) and (4), Vdata and Vclk are each extracted as signals from Vdiff and Vcom, respectively in the far-side receiver.

The de-skewer 528, much like its counterpart de-skewer 428, under the control of the skew controller 516, receives a skew error, generated by the skew error detector 524. The skew error detector 524 detects the skew error and the clock signal is adjusted to align substantially with the center of a data sample, as previously discussed relative to the link 400, which applies to all data transmission links show and discussed herein.

Figure 4C:
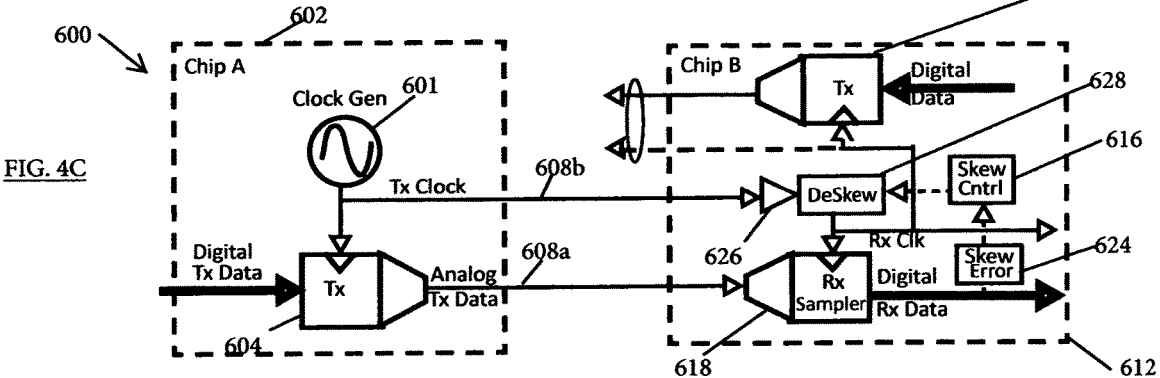

FIG. 4C shows yet another embodiment of a data transmission link, in accordance with various embodiments of the invention. The data transmission link 600 of FIG. 4C is shown to include a transmitter 602, analogous to the transmitter 100 of FIG. 1, and a transceiver 612. As with other embodiments, the data transmission link 600 is concerned with reconstructing the clock signal generated and transmitted by Clock generator 601 and data signal generated and transmitted by the transmitter 602 to the transceiver 612 as such transmission introduces errors and therefore reduces reliability by exposure to noise through a link traveled by both signals. In the embodiment of FIG. 4C however, the link is made of two physically separate wires or channels, i.e. 608a and 608b. Channel 608a carries data signals, in analog form, while channel 608b carries a clock signal. The transmitter 602 is analogous to the transmitter 300 of FIG. 2B. In this link configuration, the clock generator 601 does not need to be located inside, or a part of the transceiver 600 and can instead be a stand-alone clock generator. For example, it can be a part of yet a third chip (or device) that supplies a clock signal to both transceivers 600 and 610.

Accordingly, data and clock signals are received through the two channels 608a and 608b by the transceiver 612. The transceiver 612 is shown to include a receiver sampler 618, a transmitter 610, an amplifier 626, a de-skewer 628, a skew controller 616, and a skew error detector 624, in accordance with an embodiment of the invention. Because two channels are employed for transmission and data and clock are not combined, as some of the previously-discussed embodiments of the invention, signal from both channels are received independently of one another. Analog data transmitted by the transmitter 602, through the channel 608a, is received (with noise) by the sampler 618 and the clock signal transmitted by the clock generator 601, through the channel 608a, is received by the amplifier 626.

The received clock signal is amplified by the amplifier 626 and provided, amplified, to the de-skewer 628. The de-skewer 628 generates a receiver clock signal that is employed by the sampler 618 to sample the received data signal, at data samples forming data symbols, much like those discussed hereinabove relative to other embodiments. The sampler 618 samples or converts the received data to digital form using the clock signal generated by the de-skewer 628. This clock signal is adjusted by the de-skewer 628, to cause sampling by the sampler 618 at substantially the middle of each data sample. The skew error detector 624 generates the skew error used by the control of the skew controller 516 to adjust the clock skew for sampling using the de-skewer 628, as discussed hereinabove relative to other embodiments.

The transceiver 612 is further shown to include the transmitter 610 for receiving digital data that is to be transmitted and converting the same to analog data using the receive clock signal generated by the de-skewer 628 to perform the sampling/conversion. The transmitter can alternatively use the clock signal before the de-skew as well. The output of the transmitter 610, i.e. analog data, is ultimately transmitted on one link or channel and its associated clock signal is transmitted on another link or channel, much like how the link 608, made of the channels 608a and 608b, transmits the data and clock. In scenarios where the transceiver 612 transmits a data signal to another transceiver (e.g. transceiver 600) that already receives the clock signal from the clock generator 601, there is no need to transmit the clock signal with the data signal from the transmitter 610

FIG. 4D shows a data transmission link 700, in accordance with another embodiment of the invention. The link 700 is analogous to the link 400 of FIG. 4A except that the former includes a frequency fractional multiplier (or divider), with a ratio of M/N, in the clock generator 701 output path and a frequency fractional multiplier (or divider), with a ratio of N/M, in the clock recovery path of the transceiver 712. This multiplier, of transceiver 712, is referenced, in FIG. 4D, as the divider/multiplier 711 and serves to divide (or multiply) the received clock signal, post bandpass filtering the signal received through the link 708, by some fraction or integer. Accordingly, the multiplied clock signal is substantially at the same frequency as the original clock signal generated by the clock signal generator 701 and no longer at the same or substantially the same rate as the clock signal embedded in the signal from the link 708.

FIG. 4E shows a data transmission link 800, in accordance with another embodiment of the invention. The link 800, much like the link 500 of FIG. 4B to which it is analogous, uses differential signals and operates much like the link 500 except that its transceiver 812 has an added bandpass filter 823 positioned between the summer 822 and the amplifier 826. Thus, after the two differential signals, each including data and clock, are transmitted through the link 808 and combined by the summer 822 to extract (or recover) the clock signal and eliminate the data signals, the recovered clock is fed through the bandpass filter 823 to further extract the clock signal and eliminate the data signal. The clock is double-processed during recovery to ensure even better or more accurate clock recovery.

FIG. 4F shows a data transmission link 900, in accordance with another embodiment of the invention. The link 900 is analogous to the data transmission link of FIG. 4C except that the clock signal generator 901 is shown located externally to the transceiver 902. Therefore, the channel 908b is shown coupling the generator 901 to the transceiver 912 directly rather than through the transmitter 902. In this case, neither the transceivers on either side of the link include a clock generator and all transceivers can receive their clock from a single clock generator. In another embodiment, a single clock generator is shared among several transceivers in parallel data transmission links on both sides.

FIG. 4G shows a data transmission link 1000, in accordance with another embodiment of the invention. In FIGS. 4G through 4I, data transmission links are shown to include skew controllers and de-skewers in their transmitters. This helps to minimize the complexity of clock de-skewing on one side of the link where circuit complexity and/or power need be limited, such as in an application where a mobile device is located on an opposite end of the link. For example, in FIG. 4G, the transmitter 1002 is shown to include a de-skewer 1040 and a skew controller 1060 that controls the de-skewer 1040. The transceiver 1012 is shown to include a skew error detector 1016 and a clock extractor 105. The sampler 1018 receives analog signals from the transmitter 1002 through the link 1008. The analog signal being transmitted across the link 1008 includes a combination of data and clock signals, generated by the summer 1006 of the transmitter 1002. The clock extractor 1050, in some embodiments of the invention is analogous to the bandpass filter of FIG. 4A, the summer of FIG. 4B, or a combination thereof, as shown in FIG. 4E. In all cases, the clock signal is extracted from the combined clock and data signals received from the link 1008 and provided to both sampler 1018 and transmitter 1010 and in the case of transmission from the transceiver 1012, the extracted clock is combined with data before being transmitted out of the transceiver 1012, if necessary.

The skew error detector 1016, analogous to previously-shown and discussed embodiments herein, generates a clock skew error and transmits it to the skew controller 1060 of the transceiver 1002 where, under the latter's control, the skew error is utilized by the de-skewer 1040 in transceiver 1002 to adjust the phase of recovered clock signal post extraction in transceiver 1012 already to be, substantially, in the middle of a data symbol at the input of the receiver sampler 1018. In other words, the clock signal, embedded in the signal that arrives at the input of the transceiver 1012, is on the most part, already adjusted to sample data samples substantially at the middle of each data sample and only needs to be extracted by the transceiver 1012.

It is worthy to note that the coupling/link between the skew error detector 1016 and the skew controller 1060 need not operate at fast speeds and can be a rather slow link, thus, reducing costs.

Similarly, in FIG. 4H, the data transmission link 1100 uses the skew controller 1160 and de-skewer 1140, of the transceiver 1102, to adjust the extracted clock signal of the transceiver 1112. In this configuration, the skew controller 1140, of the transmitter 1102 receives the skew error from the skew-error detector 1116, of the transceiver 1112, which is transmitted back to the transceiver 1102, through the same link 1108. Basically, the skew error, having a very slow rate, is added to the link 1108 at transceiver 1112 using a summer 1106 and after the link in transceiver 1102, it is low-pass filtered by very low-bandwidth filter 1061 before feeding the skew error values to the skew control. The skew control block applies a correction to the de-skew block 1140 to adjust the skew on the clock from the Clock generator 1101. To this end, as in the embodiment of FIG. 4G, the output of the de-skewer 1140, not the output of the clock signal generator 1101, serves as input to the summer 1106. The summer 1106 combines an already de-skewed clock signal to the data signal before transmitting the combined data and clock signal through the link 1108. The de-skewer 1104 is coupled between the clock signal generator 1101 and the summer 1106. The summer 1106 receives analog data from the converter 1104.

On the transceiver 1112 side, while a clock extractor 1150 exits, it extracts the clock signal not directly from the link 1108, as in the embodiment of FIG. 4G, but rather from a filtered version thereof with the skew error removed. That is, the high pass filter 1063 is coupled between the summer 1122 and the clock signal extractor 1150 and eliminates low-frequency skew error signals therefore only allowing the clock signal and high-speed data signals to pass through.

Otherwise, the transceiver 1112 functions similarly to the transceiver 1012. of FIG. 4G, where the extracted clock is already de-skewed and samples data at substantially the center of the data symbols.

The skew error detector 1116 measures the skew error between the sampling point of the clock signal and the center of the data symbol, carried on the data signal that is superpositioned onto the clock signal. Therefore, a skew error output is generated by the skew error detector 1116 accordingly.

The skew error output is updated at a slow rate, as previously discussed relative to prior figures. The rate of change of the skew error output therefore has a very low frequency associated with it.

The skew error output is coupled to the link 1108 by the summer 1122. The skew error output is then removed by filtering, using the high pass filter 1163. The filtering is performed to ensure no interference with the high speed data signal and high speed clock signal coupled across the link 1108.

Low pass filter 1161 removes high speed data signals and high speed clock signals transmitted by the transmitter 1104 and the summer 1106 and therefore substantially only allows the low speed skew error signal through to the skew controller 1141 and the adjustable de-skew circuit 1140. The skew error signal adjusts for the skew experienced by the clock signal that serves as an input to the summer 1106 such that by the time the clock signal arrives at the transceiver 1112 and is extracted, its sampling phase is aligned with the center of the data signal.

FIG. 4I shows a data transmission link 1200, in accordance with another embodiment of the invention. The data transmission link 1200 is analogous to the data transmission link 1100 except that the former further includes a series capacitor (or a high-pass filter) 1203 in its transmitter 1202 coupled between the de-skewer 1240 of the transmitter 1202 and the summer 1214 of the transceiver 1212. The capacitor 1203 serves as a filter and in this respect, blocks the low-speed skew error signal from the transceiver 1212 to allow the clock signal to the transceiver 1212 to be de-skewed by the de-skewer in the transceiver 1202 before it is sent through the link 1208a, to the transceiver 1212.

In some embodiments of the invention, the transmitters of the various exemplary data transmission links shown and discussed herein are each formed on a semiconductor (or chip) separate and apart from a semiconductor onto which each transceiver is formed. For example, the transmitter 1202 may be formed on chip A and the transceiver 1212 may be formed on chip B. Chips A and B may be on the same device and therefore connected through a wire, such as a smart phone, or rather far apart and communicating through a wireless transmission link. For example, one chip may be a part of a smart phone while the other chip may be a part of the base station with which the smart phone may communicate. In other embodiments, the transmitters and transceivers may each be a device or a combination of a device and a chip. Various configurations are contemplated.

Figure 5A:
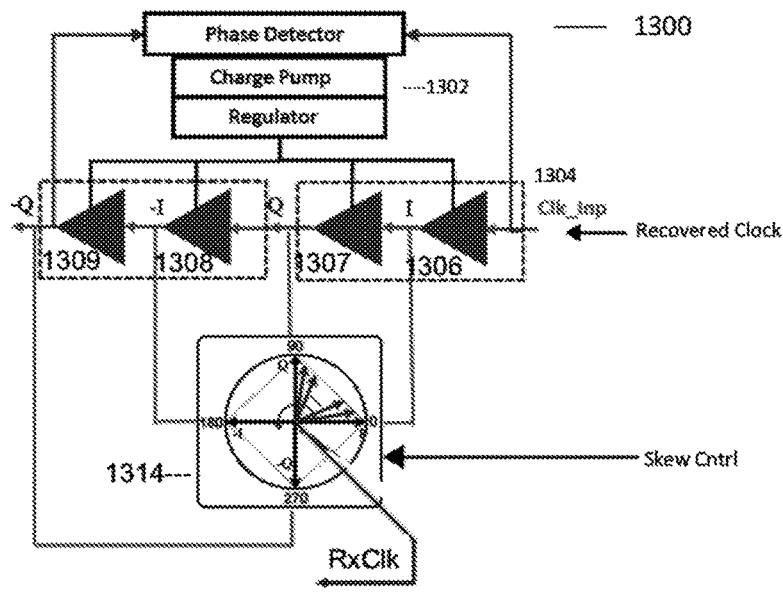
FIGS. 5A-5C schematically illustrate exemplary embodiments of an adjustable de-skew circuit.
Figure 5B:
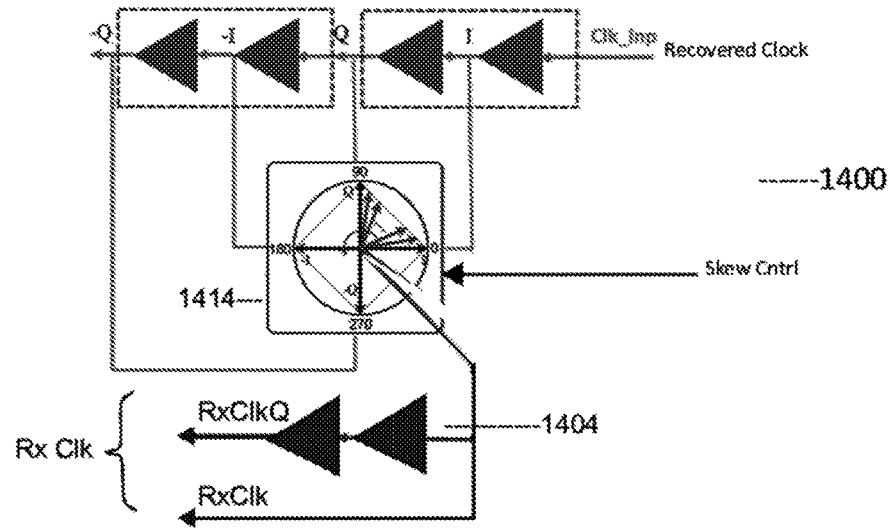
Figure 5C:
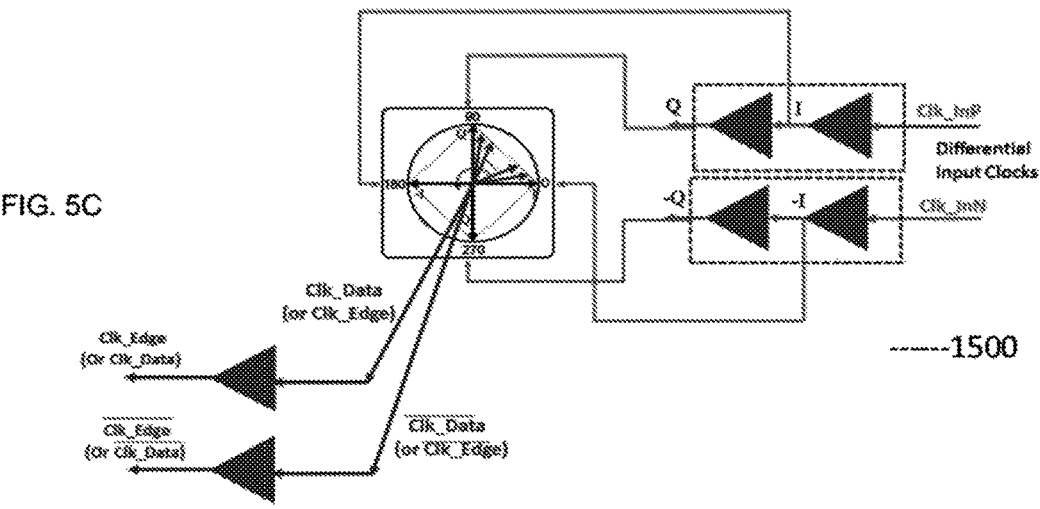

FIGS. 5A-5C each show a schematic illustration of an exemplary embodiment of an adjustable de-skew circuit. Each of these embodiments may serve as the adjustable skew circuit of the embodiments of the invention. In FIG. 5A, an adjustable skew circuit 1300 is shown to include an adjuster circuit 1302, a clock circuit 1304, and a phase interpolator 1314, in accordance with an embodiment of the invention. The adjuster circuit 1302 is shown to include a phase detector, a charge pump, and a regulator although it is understood that alternative circuitry may be employed. The clock circuit 1304 is shown to include four clock delay circuits 1306-1309, although other number of clock delays may be employed without deviating from the scope and spirit of the invention.

The circuit 1300 is shown to receive a single-ended recovered clock from, for example, one of the receiver samplers of prior embodiments shown and discussed herein. The single-ended recovered clock is coupled through the clock delay circuits 1306-1309, with each serving as a stage. The clock signal, i.e. single-ended recovered clock, is delayed at each of the clock delay circuits, therefore, four delay stages are experienced by the single-ended recovered clock. The delay at each stage is adjusted to be a quarter of a clock cycle and serves as an input to the phase interpolator 1314, as shown in FIG. 5A.

The phase interpolator 1314 generates an output clock with a phase that is approximately between the phases of two selected input clocks, also typically included in a phase interpolator, such as the interpolator 1314. The phases of the two clocks are typically adjacent to one another.

The phase of the output clock, such as the output of the circuit 1312, is controlled by the input control that adjusts the weights applied to the output of an immediately adjacent clock delay circuit whose output serves as input to the next clock stage. Based on the signal generated by a skew controller, such as those depicted and described herein, applied to the phase interpolator 1314, the output clock phase is adjusted.

Each of the clock stages, of the circuits 1306-1309, introduces a clock delay or delays the single-ended recovered clock by a quarter of clock period. For example, the single-ended recovered clock is delayed by 90 degrees at the output of the circuit 1307 and 180 degrees at the output of the circuit 1308 and 270 degrees at the output of the circuit 1309. The circuits 1306-1309 need not be precise in shifting the clock, in other words, a 90-degree phase shift need not be exact because the skew error adjustment/correction that is done by the feedback correction loop formed of the receiver sampler, the skew error detector, skew control, the adjustable de-skew circuit of the various embodiments of the invention allow for this fairly loose tolerance and correct any small phase discrepancies that may result from a less-than-exact phase shift.

FIG. 5B shows an adjustable skew circuit 1400 that is analogous to the adjustable skew circuit 1300 except that the output of the phase interpolator 1414 is input to a clock delay circuit 1404, similar to each of the circuits 1306-1309. This clock delay circuit 1404 using one or two 90-degree delay stage similar to delay stages in 1306-1309 generates phase delays that are the 90 degree or 180 degree phase shifted of the output clock (RxClk). Accordingly, an additional output clock (RxClkQ) is generated and used by the skew error detector of a transceiver, such as the transceivers discussed herein. There is therefore no need for an additional phase interpolator to generate RxClkQ separately. As can be appreciated, phase interpolators generally consume a large amount of power and consume a large amount of real estate. In applications where there is an adequate timing margin, this delay stage does not need to be very accurately set. Fig. C shows an adjustable skew circuit 1500 that is analogous to the adjustable skew circuit 1400 except that input clocks are differential.

In parallel point-to-point data transmission links one clock deskew circuit can be used for multiple data links. A method to find the error free window that is best across all the parallel data links is to sweep the delay settings of the clock deskew block and capture settings for the error free window of each data link. The best clock deskew adjustment across all the parallel links is at the middle deskew setting of the common denominator of error free windows of all links. To avoid the delay mismatches between clock and data over time, the clock and data paths are to be designed to have similar delay variations over PVT (Process, Temperature, Voltage) changes. For sampling clock in receiver (RxClk) to track data signals over time, the deskew error of one of the data links, whose best sampling phase is closest to the middle deskew setting of the common denominator of all links error free windows, can continuously be measured and used to correct the clock skew error. Alternatively, each data link can fine tune its own RxClk phase for tracking and sampling the data symbol at its center by adding switchable capacitor and/or resistors in the RxClk path. By switching in and out capacitors and/or resistor in the RxClk path, the minor clock delay adjustment can be achieved.

It will be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above. Although the description has been described with respect to particular not restrictive.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The embodiments described above are intended to be merely exemplary; numerous variations and modifications will be apparent to those skilled in the art. All such variations and modifications are intended to be within the scope of the present invention as defined in any appended claims.

What is claimed is:

1. A data transmission link comprising:
   a transmitter superpositioning a data signal and clock signal to generate a first signal and transmitting the first signal, through a link, wherein the clock signal has a frequency equal to or higher than a Nyquist frequency of the data signal; and
   a transceiver that includes:
   a first circuit responsive to the first signal and configured to substantially remove the clock signal from the first signal and extract an extracted data signal therefrom,
   a second circuit responsive to the first signal and configured to substantially remove the data signal from the first signal and extract an extracted clock signal therefrom, and
   an adjustable de-skew circuit coupled to the second circuit and responsive to the extracted clock signal and configured to substantially remove skew error from the extracted clock signal and generate a receiver clock signal, wherein the extracted data signal is sampled using the receiver clock signal causing the extracted data signal to be sampled at substantially a center of each data symbol thereof thereby increasing the reliability of data transmission,
   wherein the first circuit is a subtractor and the second circuit is a summer.

2. The data transmission link of claim 1, further including a bandpass filter coupled between the summer and the adjustable de-skew circuit.

3. The data transmission link of claim 1, wherein the first signal is transmitted as a differential signal and the transceiver further includes a second transmitter responsive to digital data and configured to sample the digital data using the extracted clock signal to transmit a differential output.

4. The data transmission link of claim 1, wherein the transceiver further includes a receiver sampler, a skew error detector, and a skew controller, wherein the skew error detector is coupled between the receiver sampler and the skew controller and generates the skew error, provided to the adjustable de-skew circuit under the control of the skew controller and the adjustable de-skew circuit removes the skew error from the extracted clock signal, further wherein, the receiver sampler is coupled to the first circuit and responsive to the extracted data signal.

5. A data transmission link, comprising:
   a transmitter to transmit a clock signal through a link, wherein the clock signal has a frequency equal to or higher than a Nyquist frequency of a data signal, said transmitter including a skew controller circuit, an adjustable de-skew circuit, a low pass filter coupled between the link and the skew controller, and a capacitor coupled between the link and the skew controller circuit, wherein:
   the data transmission link further includes a transceiver having a skew error detector for generating a skew error and transmitting the skew error to the adjustable de-skew circuit under the direction of the skew controller, and
   the adjustable de-skew circuit receives the transmitted skew error and removes the transmitted skew error from the clock signal before the clock signal is transmitted to a receiver side of the transceiver.

6. The data transmission link of claim 5, wherein the adjustable de-skew circuit includes a delay clock circuit and a phase interpolator, the delay clock circuit receiving, an input, an output of the skew controller and including more than one delay stage wherein at each delay stage, the input to the delay clock circuit is delayed in phase and the output of each of the delay stages serve as input to the phase interpolator.

7. An adjustable de-skew circuit, comprising:
   a first delay line receiving an input clock signal, said first delay line comprising a series of N substantially identical delay stages with a common coarse delay control generating N intermediate clock phases, wherein at least two of the N intermediate clock phases are loosely in-phase for a certain setting of the common coarse delay control; and
   a phase interpolator that receives the N intermediate clock phases and in response to a skew control signal interpolates two adjacent clock phases of the N intermediate clock phases to generate an output clock phase with fine phase steps.

8. The circuit of claim 7, wherein the input clock signal, the delay line and the interpolator are differential.

9. The circuit of claim 7, wherein the input clock signal, the delay line and the interpolator are single-ended.

10. The circuit of claim 7, wherein the series of N substantially identical delay stages include four substantially identical delay stages generating four intermediate clock phases that are approximately 90-degrees spaced.

11. The circuit of claim 7, further comprising a second delay line comprising a series of M replica delay stages that are substantially identical to the delay stages of the first delay line, wherein the second delay line receives the interpolator output clock and generates M versions of the interpolator output clock with substantially equal phase shifts.

12. The circuit of claim 11, wherein:

the first delay line is composed of four delay stages each providing approximately 90-degrees clock phase shift, and the second delay line comprises replica delay stages providing approximately 90-degree phase shift to generate in-phase and quadrature versions of the interpolator output clock.

13. The circuit of claim 12, where the input clock, the delay line and the interpolator are differential.

14. The circuit of claim 12, where the input clock, the delay line and the interpolator are single-ended.

15. A parallel point-to-point link, comprising:

a plurality of input data ports to receive parallel data signals from the parallel link;

a common adjustable de-skew circuit that adjusts the phase of its output clock in response to a common de-skew control signal;

a clock distribution tree network that buffers the output clock of the common adjustable de-skew circuit to provide sampling clocks with substantially same phase for the input data ports; and a skew controller circuit that receives phase errors between the sampling clock and middle of input data transitions of at least one of the data ports and generates the common de-skew control signal based on a combination of all phase errors received.

16. The parallel point-to-point link of claim 15, wherein the skew controller circuit receives the phase errors from data ports whose best sampling phase is closest to a median of best sampling phases of all data ports combined.

17. The parallel point-to-point link of claim 15, wherein the data ports have dedicated fine-tune element to adjust their sampling clocks delays independently, so that at the common de-skew control signal, the phase errors of all data ports are substantially equal regardless of the delay mismatches in the clock distribution tree network.

* * * * *

(12) EX PARTE REEXAMINATION CERTIFICATE (260th)
Ex Parte Reexamination Ordered under 35 U.S.C. 257

United States Patent
Heydari

(10) Number: US 10,735,176 C1
(45) Certificate Issued: Sep. 24, 2025

(54) HIGH-SPEED DATA RECOVERY WITH MINIMAL CLOCK GENERATION AND RECOVERY

(71) Applicant: Payem Heydari, Irvine, CA (US)

(72) Inventor: Payem Heydari, Irvine, CA (US)

(73) Assignee: NUCONCEPTS HOLDINGS LLC, Las Vegas, NV (US)

Supplemental Examination Request:
No. 96/050,075, Dec. 27, 2024

Reexamination Certificate for:
Patent No.: 10,735,176
Issued: Aug. 4, 2020
Appl. No.: 15/891,320
Filed: Feb. 7, 2018

Related U.S. Application Data

(60) Provisional application No. 62/456,521, filed on Feb. 8, 2017.

(51) Int. Cl.
*H04L 7/00* (2006.01)

(52) U.S. Cl.
CPC .......... *H04L 7/0008* (2013.01); *H04L 7/0091* (2013.01)

(58) Field of Classification Search
None
See application file for complete search history.

(56) References Cited

To view the complete listing of prior art documents cited during the supplemental examination proceeding and the resulting reexamination proceeding for Control Number 96/050,075, please refer to the USPTO's Patent Electronic System.

*Primary Examiner* — Robert J Hance

(57) ABSTRACT

A data transmission link includes a transmitter superpositioning a data signal and a clock signal to generate a first signal. The transmitter transmits the first signal, through a link, wherein, the clock signal has a frequency equal to or higher than a Nyquist frequency of the data signal.

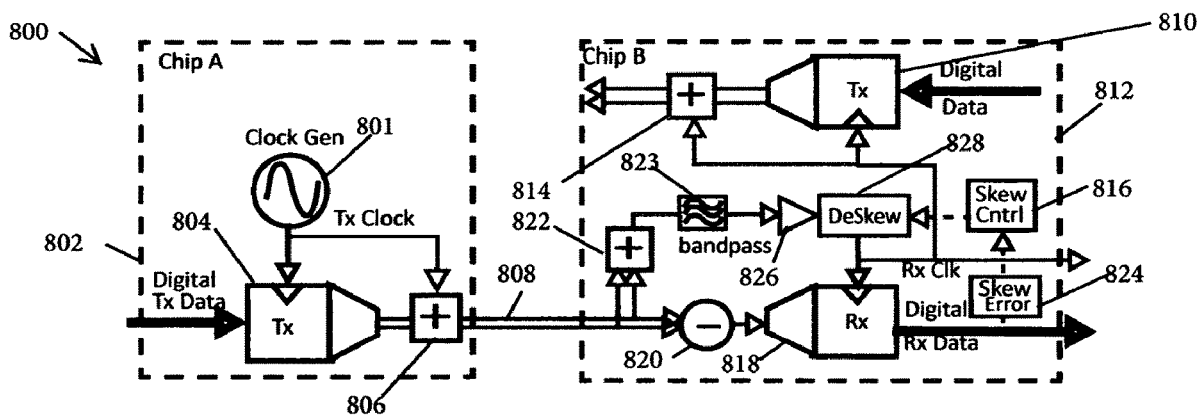

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-17 are determined to be patentable as amended.

New claims 18-19 are added and determined to be patentable.

1. A data transmission link, comprising:
   a transmitter *to* [superpositioning] *superposition* a data signal and *a* clock signal to generate a first signal [and transmitting the first signal, through a link], wherein, the clock signal has a frequency equal to or higher than a Nyquist frequency of the data signal;
   *a transceiver;*
   *a wired or wireless link between the transmitter and the transceiver; wherein the transmitter is to transmit the first signal using the wired or wireless link;* and
   [a] *wherein the* transceiver [that includes] *comprises*:
   a first circuit responsive to *receiving* the first signal and configured to substantially remove the clock signal from the first signal and [extract] *provide* an extracted data signal therefrom,
   a second circuit responsive to *receiving* the first signal and configured to substantially remove the data signal from the first signal and [extract] *provide* an extracted clock signal therefrom, and
   an adjustable de-skew circuit coupled to the second circuit and responsive to *receiving* the extracted clock signal and configured to substantially remove skew error from the extracted clock signal and generate a receiver clock signal, wherein the extracted data signal is sampled using the receiver clock signal [causing] *such that* the extracted data signal [to be] *is* sampled at substantially a center of each data symbol thereof thereby increasing the reliability of data transmission,
   wherein the first circuit is a subtractor and the second circuit is a summer.

2. The data transmission link of claim 1, further [including] *comprising* a bandpass filter coupled between the summer and the adjustable de-skew circuit.

3. The data transmission link of claim 1, wherein the first signal is transmitted as a differential signal and the transceiver further [includes] *comprises* a second transmitter responsive to *receiving* digital data and configured to sample the digital data using the extracted clock signal to transmit a differential output.

4. The data transmission link of claim 1, wherein the transceiver further [includes] *comprises* a receiver sampler, a skew error detector, and a skew controller, wherein the skew error detector is coupled between the receiver sampler and the skew controller [and generates] *to generate* the skew error, provided to the adjustable de-skew circuit under the control of the skew controller, and *wherein the* adjustable de-skew circuit [removes] *is to remove* the skew error from the extracted clock signal, [further] wherein[,] the receiver sampler is coupled to the first circuit and *is* responsive to *receiving* the extracted data signal.

5. A data transmission link *to transmit a data signal*, comprising:
   [a transmitter to transmit a clock signal through a link,] *transmitter;*
   *a transceiver;*
   *a wired or wireless link between the transmitter and the transceiver;*
   *wherein the transmitter is to transmit a clock signal using the wired or wireless link,* wherein the clock signal has a frequency equal to or higher than a Nyquist frequency of [a] *the* data signal, [said] *the* transmitter [including] *comprising* a skew controller circuit, an adjustable de-skew circuit, a low pass filter coupled between the *data transmission* link and the skew controller *circuit*, and a capacitor coupled between the *wired or wireless* link and the skew controller circuit, wherein:
   the [data transmission link further includes a] transceiver [having] *comprises* a skew error detector [for generating] *to generate* a skew error and [transmitting] *to transmit* the skew error to the adjustable de-skew circuit under [the] direction of the skew controller *circuit*, and
   the adjustable de-skew circuit [receives] *is configured to receive* the transmitted skew error and [removes] *to remove* the transmitted skew error from the clock signal before the clock signal is transmitted to a receiver side of the transceiver.

6. The data transmission link of claim 5, wherein the adjustable de-skew circuit [includes] *comprises* a delay clock circuit and a phase interpolator *circuit*, the delay clock circuit [receiving,] *to receive* an input, an output of the skew controller *circuit* and [including] *comprising* more than one delay [stage] *stages*, wherein at each *of the more than one* delay [stage] *stages*, the input to the delay clock circuit is delayed in phase and [the] *an* output of each of the *more than one* delay stages serve as input to the phase interpolator *circuit*.

7. An adjustable de-skew circuit, comprising:
   a first delay line [receiving] *circuit to receive* an input clock signal, said first delay line *circuit* comprising a series of N substantially identical delay stages with a common coarse delay control [generating] *to generate* N intermediate clock phases, wherein at least two of the N intermediate clock phases are [loosely] *substantially* in-phase for a certain setting of the common coarse delay control; and
   a phase interpolator [that receives] *circuit to receive* the N intermediate clock phases and in response to *receiving* a skew control signal [interpolates] *is to interpolate* two adjacent clock phases of the N intermediate clock phases to generate an output clock phase with fine phase steps, *wherein the two adjacent clock phases of the N intermediate clock phases exhibit a first phase difference, and wherein successive fine phase steps of the fine phase steps exhibit a second phase difference that is less than the first phase difference.*

8. The *adjustable de-skew* circuit of claim 7, wherein the input clock [signal] *circuit*, the *first* delay line *circuit* and the *phase* interpolator *circuit* are *configured as* differential *circuits*.

9. The *adjustable de-skew* circuit of claim 7, wherein the input clock [signal] *circuit*, the *first* delay line *circuit* and the *phase* interpolator *circuit* are *configured as* single-ended circuits.

10. The *adjustable de-skew* circuit of claim 7, wherein the series of N substantially identical delay stages [include] *comprise* four substantially identical delay stages generating four intermediate clock phases that are approximately 90-degrees spaced *apart*.

11. The *adjustable de-skew* circuit of claim 7, further comprising a second delay line *circuit* comprising a series of M replica delay stages that are substantially identical to the *N substantially identical* delay stages of the first delay line *circuit*, wherein the second delay line [receives] *circuit is to* the *phase* interpolator *circuit* output clock and [generates] *to generate* M versions of the *phase* interpolator *circuit* output clock with substantially equal phase shifts.

12. The *adjustable de-skew* circuit of claim 11, wherein:
the first delay line [is composed of] *circuit comprises* four delay stages each providing *an* approximately 90-[degrees] *degree* clock phase shift, and
the second delay line *circuit* comprises replica delay stages *each* providing *an* approximately 90-degree phase shift to generate *respective* in-phase and quadrature versions of the *phase* interpolator *circuit* output clock.

13. The *adjustable de-skew* circuit of claim 12, wherein the input clock *circuit*, the *first* delay line *circuit the second delay line circuit* and the *phase* interpolator *circuit* are *configured as* differential *circuits*.

14. The *adjustable de-skew* circuit of claim 12, [where] *wherein* the input clock *circuit*, the *first* delay line *circuit, the second delay line circuit* and the *phase* interpolator *circuit* are *configured as* single-ended *circuits*.

15. A parallel point-to-point link, comprising:
a plurality of input data ports to receive parallel data signals from *transmit circuitry of* the parallel *point-to-point* link;
a common adjustable de-skew circuit *shared by the plurality of input data ports* that adjusts [the] *a* phase of [its] *an* output clock *of the common adjustable de-skew circuit* in response to *receiving* a common de-skew control signal;

a clock distribution tree network [that buffers] *to buffer* the output clock of the common adjustable de-skew circuit to provide sampling clocks with substantially *a* same phase for the *plurality of* input data ports; and
a skew controller circuit [that receives] *to receive* phase errors between *a sole one of* the sampling [clock] *clocks associated with a sole input data port of the plurality of input data ports* and middle of input data [transitions] *symbols* of [at least one of] the *sole input* data [ports] *port* and [generates] *to generate* the common de-skew control signal based on a combination of all *the* phase errors received.

16. The parallel point-to-point link of claim 15, wherein the skew controller circuit [receives] *is to receive* the phase errors from *the sole input* data [ports] *port of plurality of input data ports* whose [best] *substantially most error-free* sampling phases phase is closest to a median of [best] *substantially most error-free* sampling phases of all *of the plurality of input* data ports combined.

17. The parallel point-to-point link of claim 15, wherein *each input data port of* the *plurality of input* data ports [have] *comprises a* dedicated fine-tune element to adjust [their] *a* sampling [clocks delays] *clock delay of the dedicated fine tune element* independently, [so] *such* that at *a value of* the common de-skew control signal, the phase errors of all *of the plurality of input* data ports are substantially equal regardless of [the] delay mismatches in the clock distribution tree network.

*18. The parallel point-to-point link of claim 15, wherein the sole input data port of the plurality of input data ports is pre-selected to provide the phase errors to the skew controller circuit.*

*19. The parallel point-to-point link of claim 15, wherein:*
*the parallel point-to-point link is configured such that a first delay change of the sampling clocks associated with the plurality of input data ports in response to a change in process, voltage of temperature (PVT), substantially matches a second delay change of input data signals of each of the plurality of input data ports in response to the change in PVT.*

\* \* \* \* \*